(12) United States Patent  
Shigeta (10) Patent No.: US 11,444,482 B2
(45) Date of Patent: Sep. 13, 2022

(54) UNINTERRUPTIBLE POWER SUPPLY DEVICE

(71) Applicant: TOSHIBA MITSUBISHI-ELECTRIC INDUSTRIAL SYSTEMS CORPORATION, Chuo-ku (JP)

(72) Inventor: Hiroki Shigeta, Chuo-ku (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 30 days.

(21) Appl. No.: 17/256,870

(22) PCT Filed: May 30, 2019

(86) PCT No.: PCT/JP2019/021467
§ 371 (c)(1),
(2) Date: Dec. 29, 2020

(87) PCT Pub. No.: WO2020/240761
PCT Pub. Date: Dec. 3, 2020

(65) Prior Publication Data
US 2021/0257851 A1 Aug. 19, 2021

(51) Int. Cl.
*H02J 9/06* (2006.01)
*F16K 17/36* (2006.01)
(Continued)

(52) U.S. Cl.
CPC .......... *H02J 9/06* (2013.01); *F16K 17/36* (2013.01); *F16K 31/02* (2013.01);
(Continued)

(58) Field of Classification Search
CPC ...... F16K 31/0675; F16K 31/02; F16K 17/36; H01H 47/22; H01F 7/064; H02J 9/06; H02J 9/062
See application file for complete search history.

(56) References Cited

U.S. PATENT DOCUMENTS

| 2005/0024905 A1* | 2/2005 | Shiojima | H02J 9/061 |
| | | | 363/110 |
| 2017/0126054 A1 | 5/2017 | White et al. | |
| 2018/0316216 A1* | 11/2018 | Masunaga | H02J 7/00 |

FOREIGN PATENT DOCUMENTS

| EP | 3 160 006 B1 | 4/2019 |
| JP | 2013-150415 A | 8/2013 |

OTHER PUBLICATIONS

Indian Office Action dated Jan. 6, 2022 in Indian Patent Application No. 202017055887, 5 pages.
(Continued)

*Primary Examiner* — Jared Fureman
*Assistant Examiner* — Duc M Pham
(74) *Attorney, Agent, or Firm* — Oblon, McClelland, Maier & Neustadt, L.L.P.

(57) ABSTRACT

An electromagnetic contactor (15) is connected between an AC power supply (1) and a load (18), and is turned on during bypass power feeding. A control device (20) turns on a switch (14) and turns off the electromagnetic contactor (15) when an inverter (10) has a failure during inverter power feeding. The electromagnetic contactor (15) is turned on when a contact is closed by excitation of a coil according to a control signal from the control device (20). The electromagnetic contactor (15) has a manual switch that can close the contact by being pressed from outside. An uninterruptible power supply device (100) includes a pressing force applying mechanism (22, 26, 27) that applies a pressing force to the manual switch, and a control circuit (24, 28) that operates the pressing force applying mechanism when there occurs a failure that the electromagnetic contactor (15) cannot be turned on regardless of the control signal from the control device (20).

5 Claims, 6 Drawing Sheets

(51) Int. Cl.
*F16K 31/02* (2006.01)
*F16K 31/06* (2006.01)
*H01F 7/06* (2006.01)
*H01H 47/22* (2006.01)

(52) U.S. Cl.
CPC ......... *F16K 31/0675* (2013.01); *H01F 7/064* (2013.01); *H01H 47/22* (2013.01)

(56) References Cited

OTHER PUBLICATIONS

International Search Report dated Aug. 20, 2019 in PCT/JP2019/021467 filed on May 30, 2019.

\* cited by examiner

UNINTERRUPTIBLE POWER SUPPLY DEVICE

TECHNICAL FIELD

The present invention relates to an uninterruptible power supply device.

BACKGROUND ART

Japanese Patent Laying-Open No. 2013-150415 (PTL 1) discloses an uninterruptible power supply device including a converter, an inverter, and a bypass switch. The bypass switch is turned on during bypass power feeding in which alternating current (AC) power is directly supplied from an AC power supply to a load. For example, when the inverter has a failure in a case where AC power is supplied from the inverter to the load, the bypass switch is turned on instantaneously and the AC power is directly supplied from the AC power supply to the load.

CITATION LIST

Patent Literature

PTL 1: Japanese Patent Laying-Open No. 2013-150415

SUMMARY OF INVENTION

Technical Problem

However, when there occurs a failure that an electromagnetic contactor constituting the bypass switch cannot be turned on, the uninterruptible power supply device cannot supply AC power to the load, and thus the uninterruptible power supply device may become unable to drive the load.

Accordingly, a main object of the present invention is to provide an uninterruptible power supply device that can avoid stop of power feeding to a load due to occurrence of a failure that an electromagnetic contactor that is to be turned on during bypass power feeding in which AC power is directly supplied from an AC power supply to the load cannot be turned on.

Solution to Problem

An uninterruptible power supply device in accordance with the present invention includes: a converter that converts AC power from an AC power supply into direct current (DC) power; an inverter that converts the DC power generated by the converter or DC power in a power storage device into AC power and supplies the AC power to a load; a switch connected between the inverter and the load; an electromagnetic contactor; and a control device. The electromagnetic contactor is connected between the AC power supply and the load, and is turned on during bypass power feeding in which the AC power is directly supplied from the AC power supply to the load. The control device controls the switch and the electromagnetic contactor such that the switch is turned on and the electromagnetic contactor is turned off during inverter power feeding in which the AC power is supplied from the inverter to the load, and the switch is turned off and the electromagnetic contactor is turned on when the inverter has a failure. The electromagnetic contactor is turned on when a contact is closed by excitation of a coil according to a control signal from the control device. The electromagnetic contactor has a manual switch that can close the contact by being pressed from outside. The uninterruptible power supply device further includes a pressing force applying mechanism that applies a pressing force to the manual switch, and a control circuit that operates the pressing force applying mechanism when there occurs a failure that the electromagnetic contactor cannot be turned on regardless of the control signal from the control device.

Advantageous Effects of Invention

According to the present invention, it is possible to avoid stop of power feeding to a load due to occurrence of a failure that an electromagnetic contactor that is to be turned on during bypass power feeding cannot be turned on.

DESCRIPTION OF EMBODIMENTS

Hereinafter, an embodiment of the present invention will be described in detail with reference to the drawings. It should be noted that identical or corresponding parts will be designated by the same reference numerals, and the description thereof will not be repeated.

(Configuration of Uninterruptible Power Supply Device)

Figure 1:
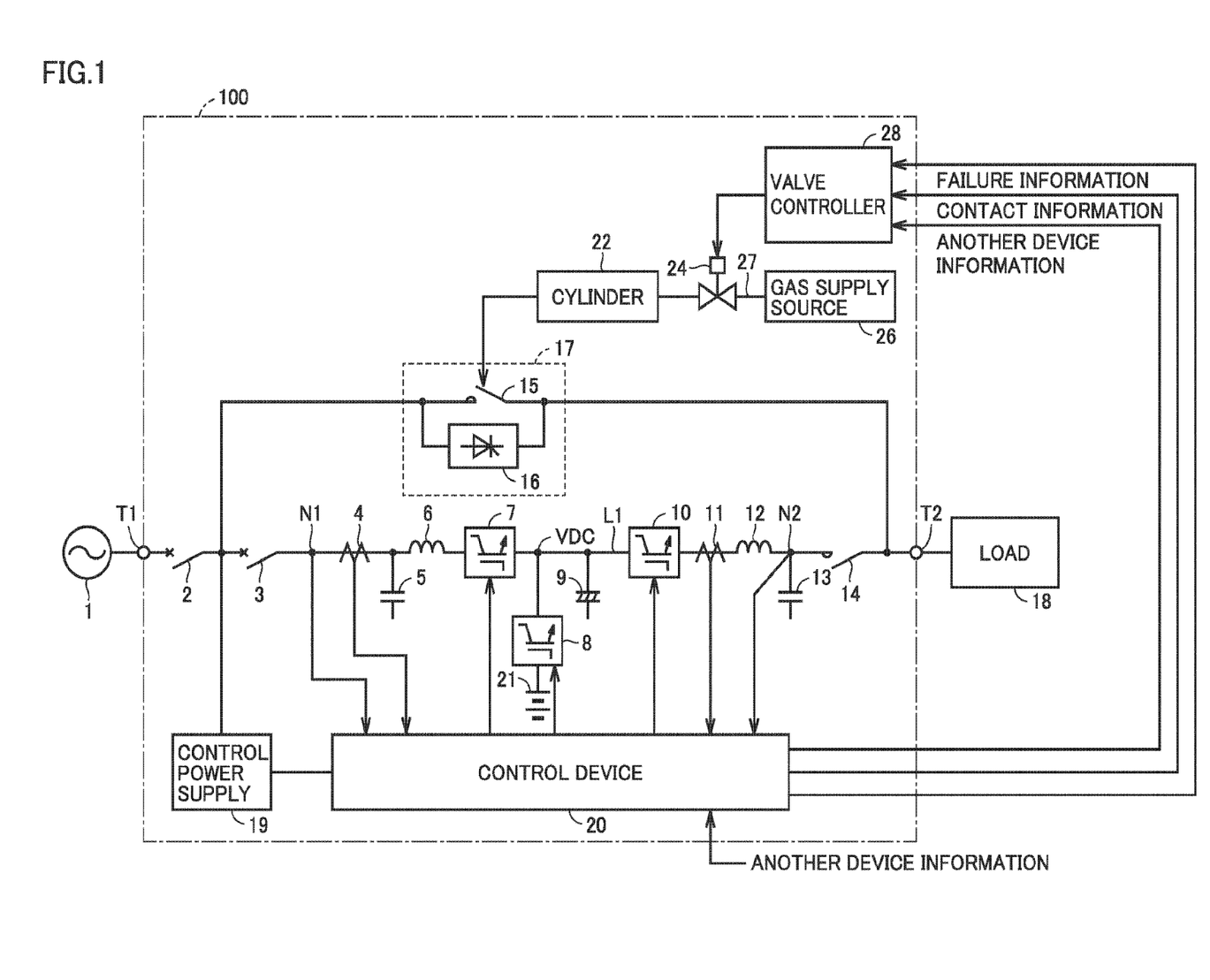
FIG. 1 is a circuit block diagram showing a configuration of an uninterruptible power supply device in accordance with an embodiment.

FIG. 1 is a circuit block diagram showing a configuration of an uninterruptible power supply device in accordance with an embodiment. Although an uninterruptible power supply device 100 in accordance with the embodiment is designed to receive three-phase AC power and output three-phase AC power, FIG. 1 shows only the part relevant to one-phase AC power for simplification of the drawing and the description.

Referring to FIG. 1, uninterruptible power supply device 100 in accordance with the embodiment includes an input terminal T1, an output terminal T2, switches 2, 3, and 14, capacitors 5, 9, and 13, reactors 6 and 12, a converter 7, a DC bus L1, an inverter 10, a bidirectional chopper 8, a battery 21, current detectors 4 and 11, a bypass circuit 17, a control power supply 19, and a control device 20.

Input terminal T1 receives AC power having a commercial frequency supplied from a commercial AC power supply 1. Input terminal T1 is connected to an input node of converter 7 via switches 2 and 3 and reactor 6. A terminal of switch 3 closer to reactor 6 is connected to capacitor 5. An instantaneous value of an AC input voltage appearing at a node N1 between switch 3 and reactor 6 is detected by control device 20.

An output node of converter 7 is connected to an input node of inverter 10 via DC bus L1, and is also connected to battery 21 via bidirectional chopper 8. Capacitor 9 is connected to DC bus L1. Battery 21 constitutes a power storage device that stores DC power. Instead of battery 21, a capacitor may be connected. An instantaneous value of a DC voltage VDC appearing at DC bus L1 is detected by control device 20.

An output node of inverter 10 is connected to one terminal of switch 14 via reactor 12. Capacitor 13 is connected to the one terminal of switch 14. The other terminal of switch 14 is connected to output terminal T2. Output terminal T2 is connected to a load 18. Load 18 is driven by AC power having a commercial frequency supplied from uninterruptible power supply device 100. An instantaneous value of an AC output voltage appearing at a node N2 between reactor 12 and switch 14 is detected by control device 20.

Switch 2 is controlled by control device 20, is turned on (conductive) during a normal state in which the AC power is supplied from commercial AC power supply 1, and is turned off (nonconductive) during a power failure in which the supply of the AC power from commercial AC power supply 1 is stopped. Switch 3 is controlled by control device 20, is turned on during a normal state, and is turned off during a power failure.

Capacitor 5 and reactor 6 constitute an input filter, which passes the AC power from commercial AC power supply 1 to converter 7, and prevents leak of a high frequency switching noise produced in converter 7 to commercial AC power supply 1.

During a normal state in which the AC power is supplied from commercial AC power supply 1, converter 7 converts the AC power from commercial AC power supply 1 into DC power, and during a power failure in which the supply of the AC power from commercial AC power supply 1 is stopped, converter 7 stops power conversion operation.

During a normal state in which the AC power is supplied from commercial AC power supply 1, bidirectional chopper 8 provides the DC power generated by converter 7 to battery 21. On this occasion, bidirectional chopper 8 converts an output voltage of converter 7 into a predetermined DC voltage and supplies it to battery 21. In addition, during a power failure, bidirectional chopper 8 supplies the DC power from battery 21 to inverter 10. On this occasion, bidirectional chopper 8 converts a voltage between terminals of battery 21 into a predetermined DC voltage and supplies it to inverter 10. Capacitor 9 temporarily stores the DC power, and smooths the output voltage of converter 7.

During a normal state in which the AC power is supplied from commercial AC power supply 1, inverter 10 converts the DC power generated by converter 7 into AC power having a commercial frequency. During a power failure, inverter 10 converts the DC power provided from battery 21 via bidirectional chopper 8 into AC power having a commercial frequency.

Reactor 12 and capacitor 13 constitute an output filter, which passes the AC power having a commercial frequency generated by inverter 10 to load 18, and prevents leak of a high frequency switching noise produced in inverter 10 toward load 18.

Switch 14 is controlled by control device 20, is turned on during an "inverter power feeding mode" in which the AC power generated by inverter 10 is supplied to load 18, and is turned off during a "bypass power feeding mode" in which the AC power is directly supplied from commercial AC power supply 1 to load 18.

Bypass circuit 17 has one terminal connected to a node between switches 2 and 3, and the other terminal connected to output terminal T2. Bypass circuit 17 has an electromagnetic contactor (contactor) 15 and a thyristor switch 16. Contactor 15 and thyristor switch 16 are connected in parallel. Thyristor switch 16 includes two thyristors connected in anti-parallel, and is turned off when a control signal from control device 20 is at a deactivation level (an L level), and is turned on when the control signal is at an activation level (an H level). Contactor 15 is turned off when a control signal from control device 20 is at an L level, and is turned on when the control signal is at an H level.

Contactor 15 is turned on during the bypass power feeding mode, and is turned off during the inverter power feeding mode. In addition, when inverter 10 has a failure in a case where the AC power is supplied from inverter 10 to load 18, contactor 15 is turned on, and supplies the AC power from commercial AC power supply 1 to load 18 via bypass circuit 17. Contactor 15 corresponds to one embodiment of a "mechanical switch".

When the inverter power feeding mode shifts to the bypass power feeding mode, and when the bypass power feeding mode shifts to the inverter power feeding mode, thyristor switch 16 is turned on only for a predetermined time in response to the control signal from control device 20, in order to prevent thyristor switch 16 from being overheated and damaged. Thyristor switch 16 corresponds to one embodiment of a "semiconductor switch".

Current detector 4 detects an instantaneous value of a current flowing to reactor 6 (that is, an input current of converter 7), and outputs a signal indicating the detected value to control device 20. Current detector 11 detects an instantaneous value of a current flowing to reactor 12 (that is, an output current of inverter 10), and outputs a signal indicating the detected value to control device 20.

Control power supply 19 receives supply of the AC power from commercial AC power supply 1, and generates a power supply voltage of control device 20.

Control device 20 receives supply of the power supply voltage from control power supply 19, and controls entire uninterruptible power supply device 100 based on the detected values of the AC input voltage, the input current of the converter, DC voltage VDC, the output current of inverter 10, and the AC output voltage, and the like.

Specifically, during the inverter power feeding mode, control device 20 turns on switch 14, and turns off contactor 15 and thyristor switch 16. Control device 20 detects whether or not a power failure occurs based on the detected value of the AC input voltage, and controls converter 7 and inverter 10 in synchronization with the phase of the AC input voltage. In addition, during a normal state in which the AC power is supplied from commercial AC power supply 1, control device 20 controls converter 7 such that DC voltage VDC becomes equal to a reference DC voltage, and during a power failure, control device 20 stops operation of converter 7. Further, during a normal state, control device 20 controls bidirectional chopper 8 such that the voltage of battery 21 becomes equal to a reference battery voltage, and during a power failure, control device 20 controls bidirectional chopper 8 such that DC voltage VDC becomes equal to the reference DC voltage.

When a failure of inverter 10 occurs during the inverter power feeding mode, control device 20 switches the inverter power feeding mode to the bypass power feeding mode. Specifically, control device 20 turns on contactor 15 and turns off switch 14. Further, control device 20 stops operation of converter 7, bidirectional chopper 8, and inverter 10.

On this occasion, control device 20 outputs the control signal at the H level to contactor 15 in order to turn on contactor 15. However, when an operation circuit for exciting a coil within contactor 15 has a failure, even if control device 20 provides the control signal at the H level to contactor 15, it is not possible to close a contact by exciting the coil, and thus it is not possible to turn on contactor 15. In this case, uninterruptible power supply device 100 cannot supply AC power having a commercial frequency to load 18, and thus uninterruptible power supply device 100 may become unable to drive load 18.

In order to avoid stop of power feeding to load 18 due to occurrence of a failure that contactor 15 cannot be turned on as described above, in uninterruptible power supply device 100 in accordance with the embodiment, a switch for manual turning on provided to contactor 15 is utilized in order to close the contact of contactor 15 and turn on contactor 15.

(Exemplary Configuration of Contactor 15)

Figure 2:
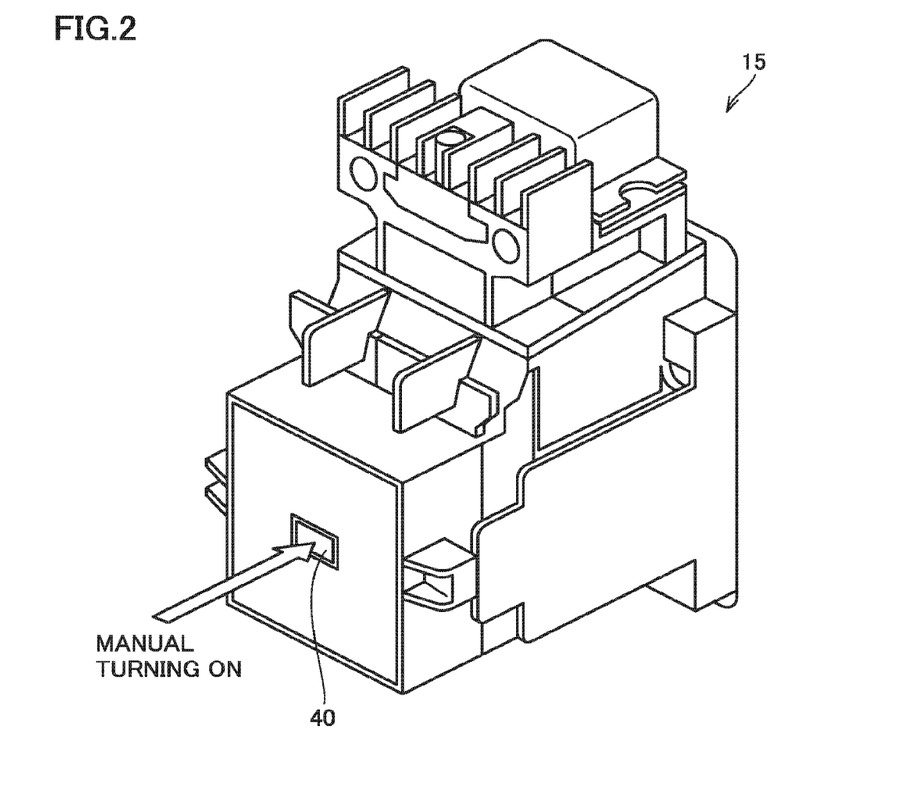
FIG. 2 is a view showing an external appearance of a contactor.
Figure 3:
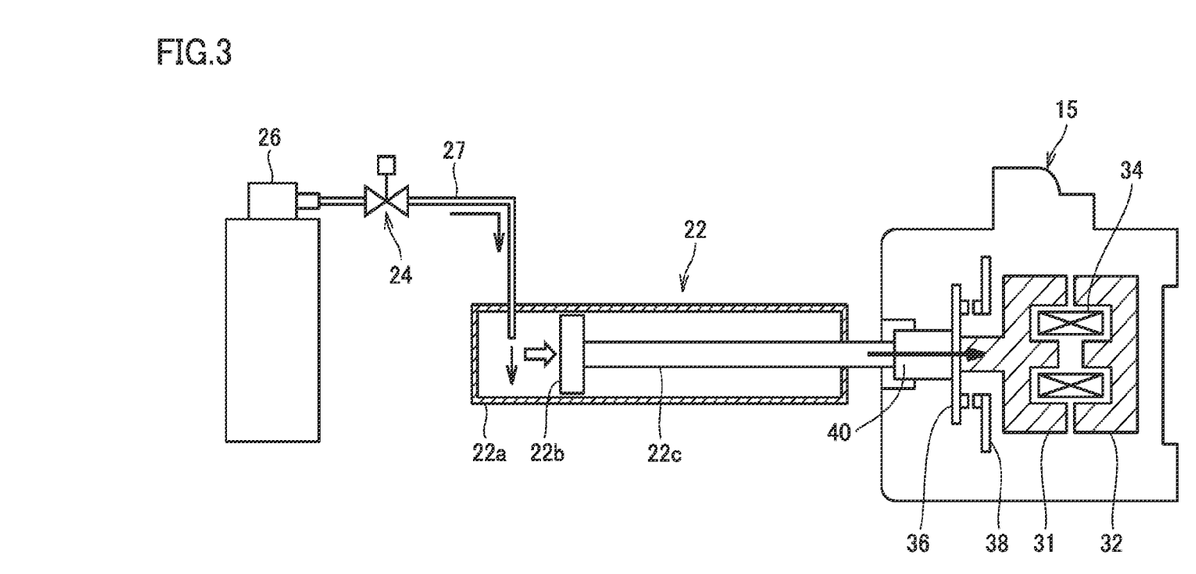
FIG. 3 is a view schematically showing an internal configuration of the contactor.

FIG. 2 is a view showing an external appearance of contactor 15. FIG. 3 is a view schematically showing an internal configuration of contactor 15.

Referring to FIG. 3, contactor 15 has a movable core 31, a stationary core 32, a coil 34, a movable contact 36, and a stationary contact 38. Movable core 31, stationary core 32, and coil 34 constitute an electromagnet. Movable contact 36 is coupled to movable core 31. When coil 34 is not excited, movable contact 36 and stationary contact 38 are separated, and thus contactor 15 is in a turned-off state.

When coil 34 is excited by applying a voltage to coil 34 from the operation circuit not shown, movable core 31 is attracted toward stationary core 32. On this occasion, movable contact 36 coupled to movable core 31 moves toward stationary contact 38. When movable contact 36 comes into contact with stationary contact 38, contactor 15 is turned on.

Further, when the excitation of coil 34 is released, movable core 31 is released, and at the same time, movable contact 36 is separated from stationary contact 38. Thereby, contactor 15 is turned off.

It should be noted that contacts of contactor 15 have a main contact for switching on/off a load current, and an auxiliary contact used for control. The auxiliary contact has an a-contact as a contact that is turned on at the same time when the main contact is turned on, and a b-contact as a contact that is turned on at the same time when the main contact is turned off.

Contactor 15 further has a manual switch 40 (hereinafter also simply referred to as a "switch 40"). Switch 40 is connected to movable contact 36. As shown in FIG. 2, switch 40 is a push button-type switch provided at a surface of a case of contactor 15.

Switch 40 is constituted such that it can be manually pressed from the outside of the case. Specifically, when switch 40 is pressed in a direction indicated by an arrow in the drawing, a pressing force is applied from switch 40 to movable contact 36. This pressing force moves movable contact 36 toward stationary contact 38, and thereby movable contact 36 comes into contact with stationary contact 38 and contactor 15 is turned on as a result. That is, by pressing switch 40, contactor 15 can be turned on by force, rather than by exciting coil 34.

This switch 40 is typically used when an operator manually turns on contactor 15 during a maintenance check for contactor 15. Alternatively, by operating switch 40 coupled to a contact in a machine latch-type contactor, the contact can be mechanically maintained in a closed state.

On the other hand, it is prohibited to manually operate switch 40 in a state where a voltage is applied to a main circuit and the operation circuit of contactor 15. Therefore, since a voltage is applied to the main circuit and the operation circuit during operation of uninterruptible power supply device 100 as shown in FIG. 1, it is not possible to manually press switch 40.

Accordingly, uninterruptible power supply device 100 in accordance with the present embodiment is constituted to include a mechanism for applying a pressing force to switch 40 (hereinafter also referred to as a "pressing force applying mechanism") in order to automatically press switch 40 rather than manually pressing the same. In the example in FIG. 3, the pressing force applying mechanism has a cylinder 22, a gas supply source 26, and a gas supply pipe 27.

Cylinder 22 has a cylinder tube 22a, a piston 22b, and a piston rod 22c. Piston 22b is arranged inside cylinder tube 22a. Piston rod 22c has one end connected to piston 22b, and the other end protruding to the outside of cylinder tube 22a and connected to switch 40 of contactor 15.

Gas supply source 26 stores a compressed inert gas (for example, nitrogen gas, argon gas, or the like). Gas supply source 26 is a gas canister, for example.

Gas supply pipe 27 has one end connected to gas supply source 26, and the other end connected to cylinder tube 22a. A gas pressure supplied from gas supply source 26 flows through gas supply pipe 27 and is introduced into the inside of cylinder tube 22a. When piston 22b is pushed in by the gas pressure introduced into the inside of cylinder tube 22a, a pressing force is applied to switch 40 by piston rod 22c connected to piston 22b, as indicated by an arrow in the drawing. By receiving this pressing force, movable contact 36 comes into contact with stationary contact 38, and thereby contactor 15 is turned on. It should be noted that, although the present embodiment illustrates a configuration of converting a gas pressure into a pressing force as a pressing force applying mechanism, a configuration of converting a pressure other than a gas pressure (for example, an oil pressure) into a pressing force may be adopted.

However, since the pressing force applying mechanism is intended to be used temporarily in a situation where inverter 10 has a failure and there occurs a failure that contactor 15 cannot be turned on, it is necessary not to operate the pressing force applying mechanism when contactor 15 is normal, or when it is desired to turn off contactor 15 (for example, during the inverter power feeding mode). Accordingly, uninterruptible power supply device 100 further includes a control circuit for controlling operation of the pressing force applying mechanism.

Specifically, in the example in FIG. 3, gas supply pipe 27 is provided with an electromagnetic valve 24 for controlling supply of the gas. Electromagnetic valve 24 is constituted such that it can control a flow rate of the gas in gas supply pipe 27 according to its degree of opening. Specifically, the supply of the gas from gas supply source 26 can be shut off by closing electromagnetic valve 24. Thus, during a normal state, electromagnetic valve 24 is closed, and, in a situation where it is desired to turn on contactor 15 but there occurs a failure that contactor 15 cannot be turned on, electromagnetic valve 24 is opened, and thereby contactor 15 can be turned on by the pressing force generated by cylinder 22.

Returning back to FIG. 1, uninterruptible power supply device 100 further has a valve controller 28 for controlling opening/closing of electromagnetic valve 24.

Electromagnetic valve 24 and valve controller 28 correspond to one embodiment of a "control circuit" for controlling operation/stop of the pressing force applying mechanism.

Valve controller 28 is constituted to control opening/closing of electromagnetic valve 24 based on information provided from control device 20. The information provided from control device 20 includes failure information, contact information, and another device information.

The "failure information" is information indicating that the inverter power feeding mode cannot be performed and there is detected a failure that contactor 15 cannot be turned on. When a failure of inverter 10 is detected, control device 20 outputs the control signal at the H level to contactor 15. When turning on of contactor 15 is not detected in a state where the control signal at the H level is output, control device 20 can detect a failure of contactor 15. It should be noted that turning on/off of contactor 15 can be detected based on an on/off state of the auxiliary contact that operates in conjunction with the main contact of contactor 15.

The "contact information" is information indicating on/off states of switch 14 and contactor 15. Turning on/off of switch 14 can be detected based on an on/off state of an auxiliary contact of switch 14, as with turning on/off of contactor 15. During the inverter power feeding mode, switch 14 is turned on and contactor 15 is turned off.

During the bypass power feeding mode, switch 14 is turned off and contactor 15 is turned on. Therefore, when both switch 14 and contactor 15 are turned off, it is clear that power is not supplied from uninterruptible power supply device 100 to load 18.

The "other device information" is information indicating an operation state of another uninterruptible power supply device (not shown) connected to load 18 in parallel with uninterruptible power supply device 100. The other device information includes information indicating whether or not the other uninterruptible power supply device supplies power to load 18. The other device information assumes a case where uninterruptible power supply device 100 is applied to an uninterruptible power supply system in which a plurality of uninterruptible power supply devices are connected to load 18 in parallel with each other. Therefore, when only one uninterruptible power supply device is connected to load 18, the other device information can be omitted.

Valve controller 28 determines whether or not to operate the pressing force applying mechanism to turn on contactor 15, based on the input information. Specifically, valve controller 28 determines to operate the pressing force applying mechanism when the following conditions (1) to (3) are satisfied:
(1) the inverter power feeding mode cannot be performed and there is detected a failure that contactor 15 cannot be turned on;
(2) both switch 14 and contactor 15 are turned off; and
(3) the other uninterruptible power supply device does not supply power to load 18.

It should be noted that, in a case where another uninterruptible power supply device is not connected to load 18 and thus the other device information is omitted, valve controller 28 determines to operate the pressing force applying mechanism when the above conditions (1) and (2) are satisfied.

Here, since the item that contactor 15 is turned off in the condition (2) is substantially included in the condition (1), the condition (2) can be restated as a condition that switch 14 is turned off. The reason for defining the condition that switch 14 is turned off is because it is not necessary to turn on contactor 15 when switch 14 is turned on (i.e., during the inverter power feeding mode), and because, if contactor 15 is turned on in a state where operation of inverter 10 is stopped and switch 14 is turned on, a portion of the power supplied from commercial AC power supply 1 to load 18 via contactor 15 may flow into inverter 10 via switch 14.

The reason for defining the condition (3) is because, if contactor 15 is turned on in a state where the other uninterruptible power supply device supplies power to load 18, a cross current may be generated between the other uninterruptible power supply device and uninterruptible power supply device 100. For example, if a power failure of commercial AC power supply 1 occurs when contactor 15 of uninterruptible power supply device 100 is turned on while the other uninterruptible power supply device performs the inverter power feeding mode, the voltage at output terminal T2 of uninterruptible power supply device 100 decreases, and thus a current may flow into uninterruptible power supply device 100 from the other uninterruptible power supply device.

When valve controller 28 determines to operate the pressing force applying mechanism, valve controller 28 controls electromagnetic valve 24 to be opened. When electromagnetic valve 24 is opened, the gas is supplied from gas supply source 26 to cylinder 22 through gas supply pipe 27. Thereby, the pressing force is applied from cylinder 22 to switch 40, and thus contactor 15 is turned on. When contactor 15 is turned on, the power is supplied from commercial AC power supply 1 to load 18 via contactor 15.

On the other hand, when at least one of the above conditions (1) to (3) is not satisfied, valve controller 28 determines not to operate the pressing force applying mechanism. In this case, valve controller 28 maintains electromagnetic valve 24 in a closed state. Since the gas is not supplied from gas supply source 26 to cylinder 22, the pressing force is not applied to switch 40, and contactor 15 is not turned on as a result.

(Exemplary Configuration of Valve Controller 28)

Figure 4:
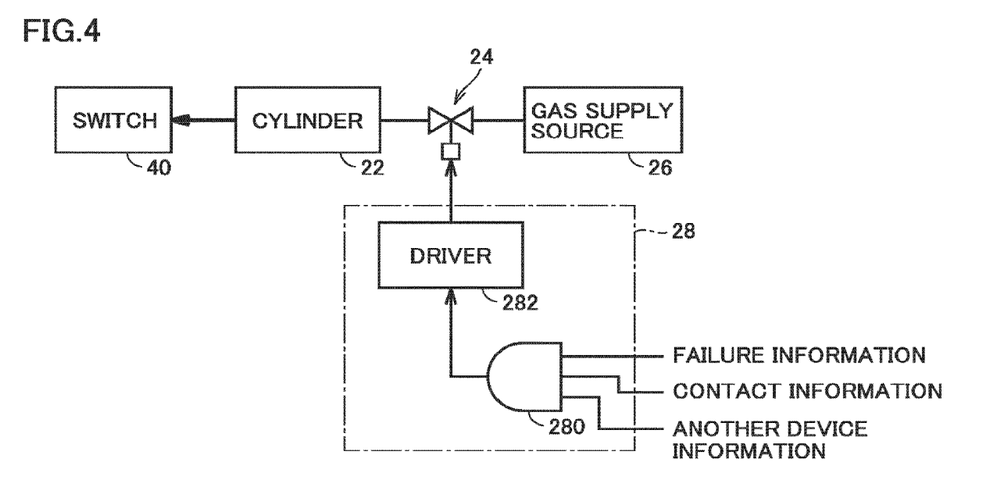
FIG. 4 is a view showing an exemplary configuration of a valve controller.

FIG. 4 is a view showing an exemplary configuration of valve controller 28 shown in FIG. 1.

Referring to FIG. 4, valve controller 28 has a logic circuit 280 and a driver 282. Logic circuit 280 calculates a logical AND of a first input signal indicating the failure information, a second input signal indicating the contact information, and a third input signal indicating the other device information, and outputs a signal indicating a calculated result to driver 282.

The first input signal indicates a logic "1" when the above condition (1) is satisfied, and indicates a logic "0" when the above condition (1) is not satisfied. The second input signal is a signal that indicates a logic "1" when the above condition (2) is satisfied, and indicates a logic "0" when the above condition (2) is not satisfied. The third input signal is a signal that indicates a logic "1" when the above condition (3) is satisfied, and indicates a logic "0" when the above condition (3) is not satisfied. It should be noted that the third input signal indicates a logic "1" also when another uninterruptible power supply device is not connected to load 18.

The output signal of logic circuit 280 indicates a logic "1" when all of the first to third input signals are a logic "1", and indicates a logic "0" when at least one of the first to third input signals is a logic "0".

When the output signal of logic circuit 280 is a logic "1", driver 282 drives electromagnetic valve 24 such that electromagnetic valve 24 is opened. On the other hand, when the output signal of logic circuit 280 is a logic "0", driver 282 drives electromagnetic valve 24 such that electromagnetic valve 24 is closed.

In the exemplary configuration in FIG. 4, by constituting valve controller 28 utilizing logic circuit 280 which is an electrical circuit, the pressing force applying mechanism can be controlled by a simple and inexpensive configuration.

As described above, according to uninterruptible power supply device 100 in accordance with the embodiment, when inverter 10 has a failure and there occurs a failure that contactor 15 cannot be turned on, contactor 15 can be turned on by operating the pressing force applying mechanism and pressing manual switch 40 provided to contactor 15. This can avoid stop of power feeding to load 18 due to occurrence of a failure that contactor 15 cannot be turned on.

(Modification)

The above embodiment has described the configuration in which electromagnetic valve 24 and valve controller 28 are used for the control circuit for controlling operation/stop of the pressing force applying mechanism. In this configuration, by constituting valve controller 28 using logic circuit 280 which is an electrical circuit, the control circuit can have a simple and inexpensive configuration. On the other hand, logic circuit 280 may be influenced by outside circumstances such as electric noise from outside, temperature, and the like. Thus, a component for protecting logic circuit 280 from electric noise, temperature, and the like is newly required.

A configuration using a fluid logic element as another exemplary configuration of the control circuit will be described below.

Figure 5:
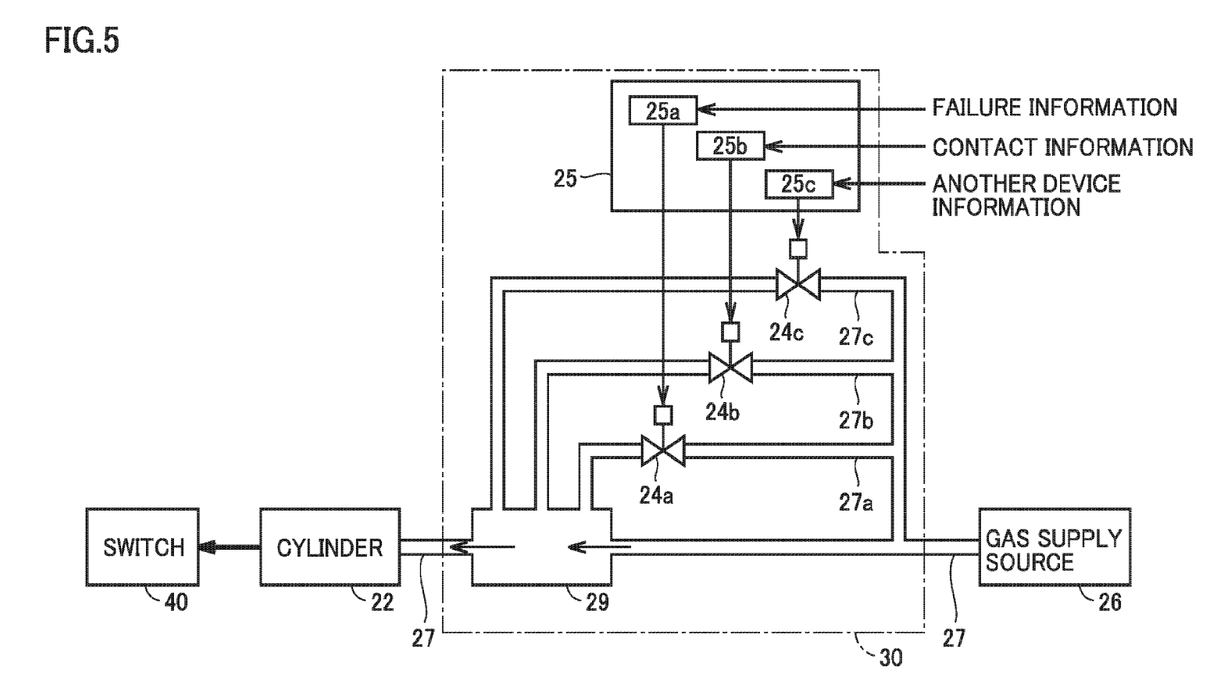
FIG. 5 is a view showing another exemplary configuration of a control circuit.

FIG. 5 is a view showing another exemplary configuration of the control circuit. Referring to FIG. 5, a control circuit 30 has a fluid logic element 29, branched pipes 27a, 27b, and 27c, electromagnetic valves 24a, 24b, and 24c, and a driver 25.

Gas supply pipe 27 is branched to a first branched pipe 27a, a second branched pipe 27b, and a third branched pipe 27c. First electromagnetic valve 24a is provided to first branched pipe 27a. Second electromagnetic valve 24b is provided to second branched pipe 27b. Third electromagnetic valve 24c is provided to third branched pipe 27c.

Driver 25 has a first driver 25a, a second driver 25b, and a third driver 25c. First driver 25a receives a first input signal indicating the failure information, and controls opening/closing of first electromagnetic valve 24a. The first input signal indicates a logic "1" when the above condition (1) is satisfied, and indicates a logic "0" when the above condition (1) is not satisfied. First driver 25a drives first electromagnetic valve 24a such that first electromagnetic valve 24a is closed when the first input signal is a logic "1" and first electromagnetic valve 24a is opened when the first input signal is a logic "0".

Second driver 25b receives a second input signal indicating the contact information, and controls opening/closing of second electromagnetic valve 24b. The second input signal indicates a logic "1" when the above condition (2) is satisfied, and indicates a logic "0" when the above condition (2) is not satisfied. Second driver 25b drives second electromagnetic valve 24b such that second electromagnetic valve 24b is closed when the second input signal is a logic "1" and second electromagnetic valve 24b is opened when the second input signal is a logic "0".

Third driver 25c receives a third input signal indicating the other device information, and controls opening/closing of third electromagnetic valve 24c. The third input signal indicates a logic "1" when the above condition (3) is satisfied, and indicates a logic "0" when the above condition (3) is not satisfied. It should be noted that the third input signal indicates a logic "1" also when another uninterruptible power supply device is not connected to load 18. Third driver 25c drives third electromagnetic valve 24c such that third electromagnetic valve 24c is closed when the third input signal is a logic "1" and third electromagnetic valve 24c is opened when the third input signal is a logic "0".

Figure 6:
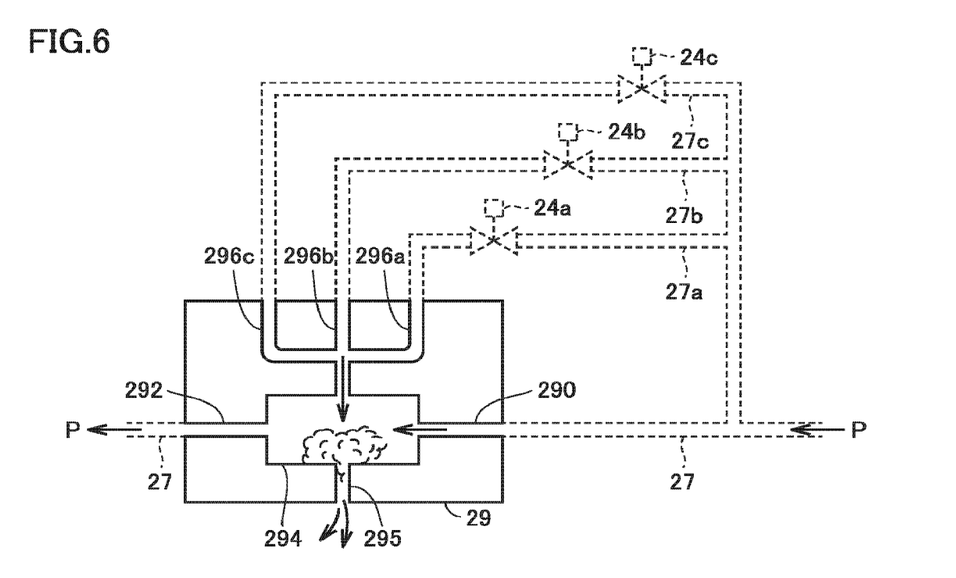
FIG. 6 is a view showing an exemplary configuration of a fluid logic element shown in FIG. 5.

Fluid logic element 29 is connected to gas supply pipe 27 and branched pipes 27a, 27b, and 27c. FIG. 6 is a view showing an exemplary configuration of fluid logic element 29 shown in FIG. 5.

Referring to FIG. 6, fluid logic element 29 has an input port 290, control ports 296a, 296b, 296c, and 295, a turbulence amplifier 294, and an output port 292.

Input port 290 is connected to gas supply pipe 27. Output port 292 is connected to gas supply pipe 27. First control port 296a is connected to first branched pipe 27a. Second control port 296b is connected to second branched pipe 27b. Third control port 296c is connected to third branched pipe 27c. When first electromagnetic valve 24a is opened, a control gas pressure acts on first control port 296a from first branched pipe 27a. When second electromagnetic valve 24b is opened, a control gas pressure acts on second control port 296b from second branched pipe 27b. When third electromagnetic valve 24c is opened, a control gas pressure acts on third control port 296c from third branched pipe 27c.

Turbulence amplifier 294 is connected between input port 290 and output port 292. Control ports 296a to 296c and 295 are connected to turbulence amplifier 294. Turbulence amplifier 294 is constituted to output a gas pressure P to output port 292 when gas pressure P is input to input port 290. However, when the control gas pressure acts on at least one of control ports 296a, 296b, and 296c, the control gas pressure collides with gas pressure P and an output occurs at control port 295, and thus no output occurs at output port 292.

In the example in FIG. 6, when the control gas pressure does not act on any of control ports 296a, 296b, and 296c, that is, when all of electromagnetic valves 24a, 24b, and 24c are closed, fluid logic element 29 allows the gas pressure to flow through gas supply pipe 27. Thus, when all of the above conditions (1) to (3) are satisfied, the gas pressure is supplied from gas supply source 26 to cylinder 22.

On the other hand, when the control gas pressure acts on at least one of control ports 296a, 296b, and 296c, that is, when at least one of electromagnetic valves 24a, 24b, and 24c is opened, fluid logic element 29 does not allow the gas pressure to flow through gas supply pipe 27. Thus, when at least one of the above conditions (1) to (3) is not satisfied, the gas pressure is not supplied from gas supply source 26 to cylinder 22.

It should be noted that, in a case where another uninterruptible power supply device is not connected to load 18 and thus the other device information is omitted in the present modification, third branched pipe 27c, third electromagnetic valve 24c, and third driver 25c can be omitted. In this case, when the control gas pressure does not act on any of control ports 296a and 296b, that is, when both electromagnetic valves 24a and 24b are closed, fluid logic element 29 allows the gas pressure to flow through gas supply pipe 27. Thus, when all of the above conditions (1) and (2) are satisfied, the gas pressure is supplied from gas supply source 26 to cylinder 22.

On the other hand, when the control gas pressure acts on at least one of control ports 296a and 296b, that is, when at least one of electromagnetic valves 24a and 24b is opened, fluid logic element 29 does not allow the gas pressure to flow through gas supply pipe 27. Thus, when at least one of the above conditions (1) and (2) is not satisfied, the gas pressure is not supplied from gas supply source 26 to cylinder 22.

Also in the present modification, the same function and effect as those in the embodiment described above can be exhibited. Further, in the present modification, by using fluid logic element 29 for control circuit 30 of the pressing force applying mechanism, influence of outside circumstances such as electric noise, temperature, and the like can be reduced, when compared with the exemplary configuration in FIG. 4.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: commercial AC power supply; 2, 3, 14: switch; 4, 11: current detector; 7: converter; 8: bidirectional chopper; 10: inverter; 15: contactor; 16: thyristor switch; 17: bypass circuit; 18: load; 19: control power supply; 20: control device; 21: battery; 22: cylinder; 22a: cylinder tube; 22b: piston; 22c: piston rod; 24, 24a to 24c: electromagnetic valve; 25, 25a, 25b, 25c: driver; 26: gas supply source; 27: gas supply pipe; 27a, 27b, 27c: branched pipe; 28: valve controller; 29: fluid logic element; 30: control circuit; 31: movable core; 32: stationary core; 34: coil; 36: movable contact; 38: stationary contact; 40: manual switch; 100: uninterruptible power supply device; 280: logic circuit; 290: input port; 292: output port; 294: turbulence amplifier; 295, 296a to 296c: control port; L1: DC bus.

The invention claimed is:

1. An uninterruptible power supply device comprising:
a converter that converts AC power from an AC power supply into DC power;
an inverter that converts the DC power generated by the converter or DC power in a power storage device into AC power and supplies the AC power to a load;
a switch connected between the inverter and the load;
an electromagnetic contactor that is connected between the AC power supply and the load, and is turned on during bypass power feeding in which the AC power is directly supplied from the AC power supply to the load;
a control device that controls the switch and the electromagnetic contactor such that the switch is turned on and the electromagnetic contactor is turned off during inverter power feeding in which the AC power is supplied from the inverter to the load, and the switch is turned off and the electromagnetic contactor is turned on when the inverter has a failure,
the electromagnetic contactor being turned on when a contact is closed by excitation of a coil according to a control signal from the control device, and having a manual switch that can close the contact by being pressed from outside;
a pressing force applying mechanism that applies a pressing force to the manual switch; and
a control circuit that operates the pressing force applying mechanism when there occurs a failure that the electromagnetic contactor cannot be turned on regardless of the control signal from the control device,
the control circuit operates the pressing force applying mechanism when first to third conditions are satisfied,
the first condition is that the inverter power feedinn cannot be performed and there is detected a failure that the electromagnetic contactor cannot be turned on,
the second condition is that both the switch and the electromagnetic contactor are turned off, and
the third condition is that another uninterruptible power supply device is not connected to the load in parallel with the uninterruptible power supply device. or that, when the other uninterruptible power supply device is connected, the other uninterruptible power supply device does not supply power to the load.

2. The uninterruptible power supply device according to claim 1, wherein
the pressing force applying mechanism includes
a cylinder that converts a gas pressure into the pressing force to the manual switch,
a gas supply source that stores a compressed inert gas, and
a gas supply pipe for supplying the gas pressure from the gas supply source to the cylinder, and
the control circuit includes
an electromagnetic valve that is placed in the gas supply pipe and controls supply of the gas pressure to the cylinder,
a logic circuit that performs a logic operation of a first input signal indicating the first condition, a second input signal indicating the second condition, and a third input signal indicating the third condition, and
a driver that drives the electromagnetic valve according to an output signal of the logic circuit.

3. The uninterruptible power supply device according to claim 2, wherein
each of the first to third input signals indicates a logic "1" when a corresponding condition is satisfied, and indicates a logic "0" when the corresponding condition is not satisfied, and
the logic circuit outputs a signal for opening the electromagnetic valve to the driver when all of the first to third input signals are a logic "1".

4. The uninterruptible power supply device according to claim 2, wherein
the pressing force applying mechanism includes
a cylinder that converts a gas pressure into the pressing force to the manual switch,
a gas supply source that stores a compressed inert gas, and
a gas supply pipe for supplying the gas pressure from the gas supply source to the cylinder, and
the control circuit includes
first to third branched pipes branched from the gas supply pipe,
a first electromagnetic valve that is placed in the first branched pipe and is driven by receiving a first input signal indicating the first condition,
a second electromagnetic valve that is placed in the second branched pipe and is driven by receiving a second input signal indicating the second condition,
a third electromagnetic valve that is placed in the third branched pipe and is driven by receiving a third input signal indicating the third condition, and
a fluid logic element that is connected to the gas supply pipe and the first to third branched pipes, and outputs a gas pressure to the cylinder by a logic operation of the gas pressure in the gas supply pipe and gas pressures in the first to third branched pipes.

5. The uninterruptible power supply device according to claim 4, wherein
each of the first to third input signals indicates a logic "1" when a corresponding condition is satisfied, and indicates a logic "0" when the corresponding condition is not satisfied, and
the first to third electromagnetic valves are respectively closed when the first to third input signals are a logic "1", and the fluid logic element outputs the gas pressure to the cylinder when the gas pressures do not act from all of the first to third branched pipes.

* * * * *